United States Patent
Schaible (10) Patent No.: US 11,711,020 B2
(45) Date of Patent: Jul. 25, 2023

(54) TRANSFORMERS FOR MULTIPHASE POWER CONVERTERS

(71) Applicant: Astec International Limited, Kowloon (HK)

(72) Inventor: Todd Martin Schaible, Orono, MN (US)

(73) Assignee: Astec International Limited, Kowloon (HK)

( * ) Notice: Subject to any disclaimer, the term of this patent is extended or adjusted under 35 U.S.C. 154(b) by 393 days.

(21) Appl. No.: 16/840,994

(22) Filed: Apr. 6, 2020

(65) Prior Publication Data

US 2021/0313895 A1   Oct. 7, 2021

(51) Int. Cl.
| | |
|---|---|
| *H02M 3/335* | (2006.01) |
| *H01F 27/24* | (2006.01) |
| *H01F 27/28* | (2006.01) |
| *H01F 27/30* | (2006.01) |

(52) U.S. Cl.
CPC ........ *H02M 3/33569* (2013.01); *H01F 27/24* (2013.01); *H01F 27/28* (2013.01); *H01F 27/306* (2013.01)

(58) Field of Classification Search
CPC ... H02M 3/33569; H02M 7/003; H01F 27/24; H01F 27/28; H01F 3/10; H01F 30/12
See application file for complete search history.

(56) References Cited

U.S. PATENT DOCUMENTS

| | | | |
|---|---|---|---|
| 4,488,136 A | 12/1984 | Hansen et al. | |
| 6,362,986 B1 | 3/2002 | Schultz et al. | |
| 7,489,225 B2 | 2/2009 | Dadafshar | |
| 7,598,839 B1 | 10/2009 | Wedley | |
| 9,165,707 B2 | 10/2015 | Kippley et al. | |
| 2013/0201728 A1 | 8/2013 | Njiende et al. | |
| 2014/0266530 A1 | 9/2014 | Andres et al. | |

(Continued)

FOREIGN PATENT DOCUMENTS

| | | | |
|---|---|---|---|
| JP | S6437015 A | | 2/1989 |
| JP | S6437015 | * | 3/1989 |

(Continued)

OTHER PUBLICATIONS

International Search Report and Written Opinion for PCT/US2021/025120, dated Jun. 29, 2021; 11 pages.

*Primary Examiner* — Adolf D Berhane
*Assistant Examiner* — Afework S Demisse (57) ABSTRACT

A transformer for a multiphase power converter includes a magnetic structure, a first coil configured to electrically couple to an input circuit or an output circuit of a subconverter of the multiphase power converter, and a second coil configured to electrically couple to an input circuit or an output circuit of another subconverter of the multiphase power converter. The magnetic structure includes a top member, a bottom member, and legs extending between the top member and the bottom member in substantially the same direction. The legs include two outer members and two inner members. The first coil is wound about one of the two inner members of the magnetic structure, and the second coil is wound about the other one of the two inner members of the magnetic structure. Other example transformers, and multiphase power converters including transformers are also disclosed.

15 Claims, 8 Drawing Sheets

(56) References Cited

U.S. PATENT DOCUMENTS

| | | | |
|---|---|---|---|
| 2014/0340940 A1* | 11/2014 | Ouyang | ............... H01F 30/06 336/170 |
| 2017/0214330 A1 | 7/2017 | Yang et al. | |
| 2018/0061560 A1 | 3/2018 | Wukovits et al. | |
| 2018/0323720 A1 | 11/2018 | Njiende et al. | |
| 2020/0286670 A1* | 9/2020 | Sigamani | ............... H01F 27/24 |

FOREIGN PATENT DOCUMENTS

| | | | | |
|---|---|---|---|---|
| JP | H05205956 | * | 8/1993 | |
| JP | H05205956 A | * | 8/1993 | ............ H01F 27/02 |
| JP | H05205956 A | | 8/1993 | |
| JP | 2002057045 A | | 2/2002 | |

\* cited by examiner

TRANSFORMERS FOR MULTIPHASE POWER CONVERTERS

FIELD

The present disclosure relates to transformers for multiphase power converters.

BACKGROUND

This section provides background information related to the present disclosure which is not necessarily prior art.

Power converters convert electrical power between inputs and outputs. The power converters sometimes include multiple phases each having a transformer. Each of the transformers may include windings and its own core for the windings. In such examples, each core may have an E-E or an E-I configuration. In other examples, the windings of multiple transformers may be wound on a shared magnetic core. In such examples, the shared magnetic core may have an E-E-I configuration.

SUMMARY

This section provides a general summary of the disclosure, and is not a comprehensive disclosure of its full scope or all of its features.

According to one aspect of the present disclosure, a multiphase power converter includes a plurality of subconverters each having an input circuit and an output circuit, and a transformer for the plurality of subconverters. The transformer includes a magnetic structure, a first coil electrically coupled to the input circuit or the output circuit of one of the subconverters, and a second coil electrically coupled to the input circuit or the output circuit of another one of the subconverters. The magnetic structure includes a top member, a bottom member, and a plurality of legs extending between the top member and the bottom member in substantially the same direction. The legs include two outer members and two inner members positioned between the two outer members. The first coil is wound about one of the two inner members of the magnetic structure, and the second coil is wound about the other one of the two inner members of the magnetic structure.

According to another aspect of the present disclosure, a transformer for a multiphase power converter includes subconverters each having an input circuit and an output circuit. The transformer includes a magnetic structure, a first coil configured to electrically couple to the input circuit or the output circuit of one of the subconverters, and a second coil configured to electrically couple to the input circuit or the output circuit of another one of the subconverters. The magnetic structure includes a top member, a bottom member, and a plurality of legs extending between the top member and the bottom member in substantially the same direction. The legs include two outer members and two inner members positioned between the two outer members. The first coil is wound about one of the two inner members of the magnetic structure, and the second coil is wound about the other one of the two inner members of the magnetic structure.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding (but not necessarily identical) parts and/or features throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

Figure 1:
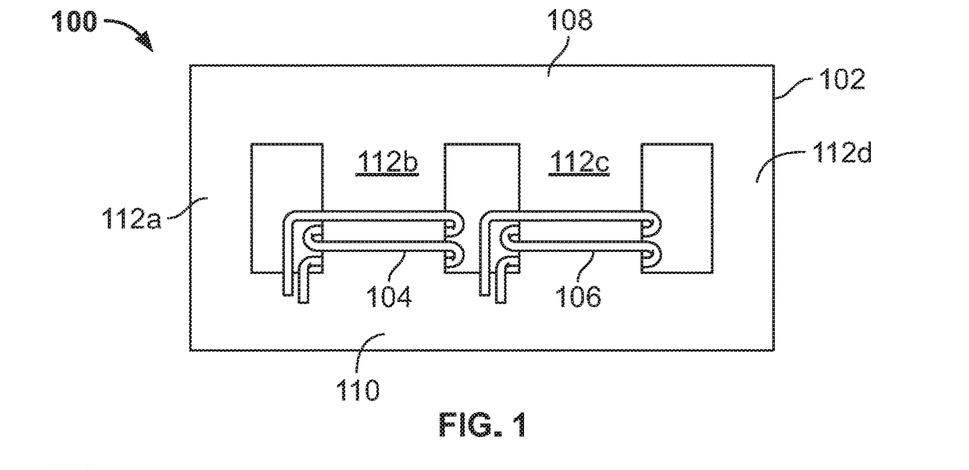
FIG. 1 is a front view of a transformer for a multiphase power converter, where the transformer includes four legs and coils wound about two of the four legs according to one example embodiment of the present disclosure.

A transformer for a multiphase power converter according to one example embodiment of the present disclosure is illustrated in FIG. 1, and indicated generally by reference number 100. As shown in FIG. 1, the transformer 100 includes a magnetic structure 102, and coils 104, 106. The magnetic structure (e.g., a magnetic core) 102 includes multiple core sections. For example, the magnetic structure 102 includes members 108, 110, and legs extending between the members 108, 110 in substantially the same direction. The legs include two outer members (e.g., legs) 112a, 112d, and two inner members (e.g., legs) 112b, 112c positioned between the two outer members 112a, 112d. As shown in FIG. 1, the coil 104 is wound about the inner member 112b, and the coil 106 is wound about the inner member 112c.

By employing any one of the transformers disclosed herein, the effective core area of its magnetic structure through which magnetic fluxes induced by coils will pass through may be increased as compared to conventional magnetic structures. For example, and as further explained below, the core sections of any one of the magnetic structures disclosed herein are arranged so that magnetic fluxes generated by the coils flow through a higher amount (and sometimes all) of the core sections as compared to conventional magnetic structures. In some examples, the magnetic structures disclosed herein may have, for example, an effective core area 33% larger than conventional magnetic structures. Additionally, the total volume of the magnetic structure may remain substantially the same as the total volume of conventional magnetic structures. As such, the effective core area per volume of the magnetic structure may be increased as compared to conventional magnetic structures. In other examples, the total volume of the magnetic structure may be reduced as compared to conventional magnetic structures, while the effective core area may remain substantially the same as the effective core area of the conventional magnetic structures. Because of the increased effective core area and/or reduced volume of the magnetic structure, a higher power density and efficiency of the multiphase power converter employing the transformer may be achieved as compared to multiphase power converter employing conventional transformers.

In the particular example of FIG. 1, the members 108, 110 extend in substantially parallel planes separated by the legs 112a, 112b, 112c, 112d. Additionally, the legs 112a, 112b, 112c, 112d extend in substantially parallel planes that are perpendicular to the member planes. As such, the members 108, 110 are substantially parallel to each other, and the legs 112a, 112b, 112c, 112d are substantially parallel to each other and substantially perpendicular to the members 108, 110. In such examples, the members 108, 110 and the legs 112a, 112b, 112c, 112d define three windows, as shown in FIG. 1.

In the example of FIG. 1, the members 108, 110 and the legs 112a, 112b, 112c, 112d have a generally rectangular-shape relative to their cross sections. In other embodiments, any one of the members 108, 110 and/or legs 112a, 112b, 112c, 112d may have another suitable cross-sectional shape if desired.

In the particular example of FIG. 1, the magnetic structure 102 includes only four legs 112a, 112b, 112c, 112d extending between the members 108, 110. In such examples, the cross-sectional area of each outer leg 112a, 112d may be substantially equal, and the cross-sectional area of each inner leg 112b, 112c may be substantially equal. Additionally, the cross-sectional area of each outer leg 112a, 112d may be about half the cross-sectional area of each inner leg 112b, 112c.

In other embodiments, and as further explained below, the magnetic structure 102 may include additional legs extending between the members 108, 110. For example, the magnetic structure 102 may include an additional inner leg. In such examples, the amount of material forming each outer leg 112a, 112d may be reduced. The material removed from each outer leg 112a, 112d may be used to form the additional inner leg. As such, the reduction of material in each outer leg 112a, 112d may be substantially equal to the amount of material in the additional inner leg. As a result, the cross-sectional area of each outer leg 112a, 112d may be decreased as compared to embodiments employing only four legs. Thus, when an additional inner leg is employed, the cross-sectional area of each outer leg 112a, 112d may be less than half the cross-sectional area of each inner leg 112b, 112c.

As explained above, the transformer 100 includes the coils 104, 106 wound about the inner legs 112b, 112c. In the particular example of FIG. 1, the coils 104, 106 are wound about only the inner legs 112b, 112c. Thus, no coil is wound about the outer leg 112a, the outer leg 112d, the member 108, or the member 110. In other examples, the transformer 100 may include one or more coils wound about another core member such as the outer leg 112a, the outer leg 112d, the member 108 and/or the member 110 if desired.

In the example of FIG. 1, the coils 104, 106 may represent transformer windings in the multiphase power converter. For example, one of the coils (e.g., the coil 104) may represent a primary winding or secondary winding of one phase of the power converter, and the other coil (e.g., the coil 106) may represent a primary winding or secondary winding of another phase of the power converter. In such examples, the coil 104 may electrically couple to an input circuit in one phase if the coil 104 represents a primary winding. Alternatively, the coil 104 may electrically couple to an output circuit in one phase if the coil 104 represents a secondary winding. The coil 106 may electrically couple in a similar manner, but in another phase of the power converter.

Figure 2:
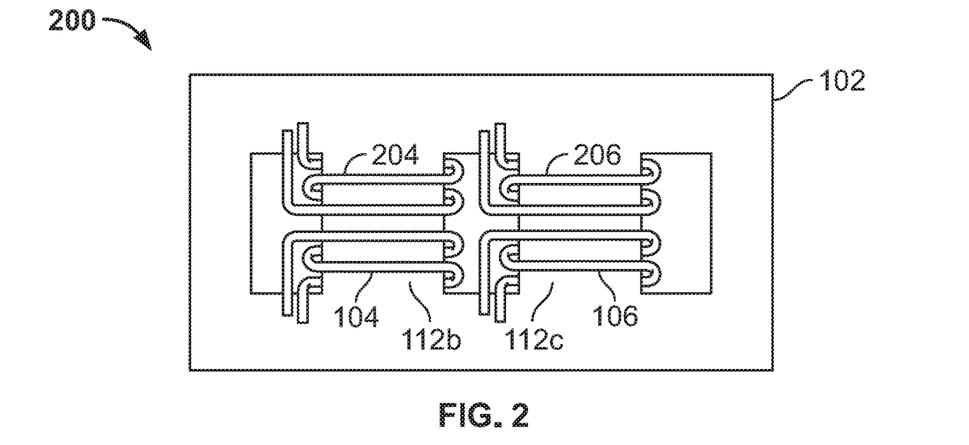
FIG. 2 is a front view of the transformer of FIG. 1, but including multiple coils wound about two of the four legs according to another example embodiment.

In some examples, the transformer 100 includes multiple coils wound about each inner leg 112b, 112c. For example, FIG. 2 illustrates a transformer 200 similar to the transformer 100 of FIG. 1, but including two sets of coils wound about each inner leg. Specifically, and as show in FIG. 2, the transformer 200 includes the magnetic structure 102 of FIG. 1, the coils 104, 106 wound about the inner legs 112b, 112c of FIG. 1, a coil 204 wound about the inner leg 112b, and a coil 206 wound about the inner leg 112c.

In the example of FIG. 2, the coils 104, 106, 204, 206 may represent any one of the transformer windings in the multiphase power converter. For example, the coil 104 may represent a primary winding of one phase of the power converter, and electrically couple to an input circuit in that phase. Additionally, the coil 204 may represent a secondary winding in the same phase, and electrically couple to an output circuit in that phase. The coils 106, 206 may represent similar (or different) transformer windings, and electrically couple in a similar manner as the coils 104, 204, but in another phase of the power converter.

Figure 3:
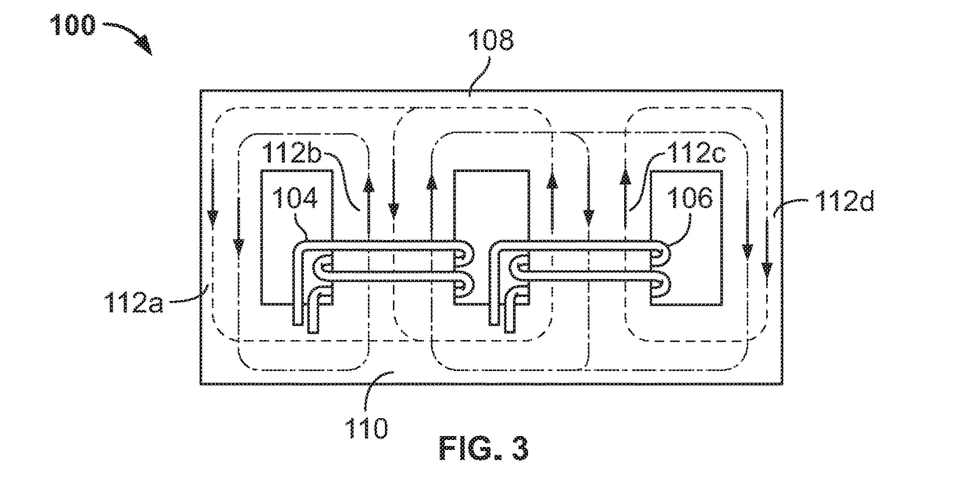
FIG. 3 is a front view of the transformer of FIG. 1 showing magnetic flux generated by the coils according to yet another example embodiment.

Referring back to FIG. 1, the magnetic structure 102 forms paths for magnetic flux generated (e.g., induced) by the coils 104, 106 when the coils 104, 106 are energized. For example, FIG. 3 illustrates the transformer 100 of FIG. 1 with magnetic flux generated by the coils 104, 106. As shown in FIG. 3, lines having a "dash-dot-dash" configuration represent the magnetic flux generated by the coil 104, and lines having a "dash-dash-dash" configuration represent the magnetic flux generated by the coil 106. The magnetic flux generated by the coils 104, 106 flows through each of the legs 112a, 112b, 112c, 112d, and the members 108, 110 of the magnetic structure (e.g. the shared magnetic core) 102. As shown in FIG. 3, all of the magnetic flux induced by the coil 104 passes through the center leg 112b, and all of the magnetic flux induced by the coil 106 passes through the center leg 112c.

The magnetic flux generated from the coils 104, 106 may interact in the magnetic structure 102. For example, and as shown in FIG. 3, the magnetic flux generated from the coils 104, 106 flows in opposite directions in the inner legs 112b, 112c, and portions of the members 108, 110. In such examples, the magnetic flux flowing in the opposite directions may at least partially cancel in the magnetic structure 102. In some examples, the generated magnetic flux may completely cancel in the inner legs 112b, 112c and/or portions of the members 108, 110.

Additionally, the generated magnetic flux from the coils 104, 106 may be driven out of phase. In such examples, some of the magnetic flux driven by the coil 104 may inductively (e.g., magnetically) couple to the coil 106 through the inner leg 112c. Likewise, some of the magnetic flux driven by the coil 106 may inductively couple to the coil 108 through the inner leg 112b. The amount of inductive coupling between the coils is a function of the magnetic structure's geometry including air gaps (if employed) within the magnetic paths.

By allowing some of the magnetic flux generated by one coil (e.g., the coil 104) to couple to the other coil (e.g., the coil 106), the active start point of B-H curves in a multiphase power converter employing the transformer 100 of FIG. 1 may be advantageously shifted. For example, the active start point of a B-H curve of each subconverter in the power converter may be shifted from zero to a negative value in the third quadrant. This may move unipolar first quadrant B-H loop operation to operation in the first and third quadrants, as further explained below. As a result, the flux swing before saturation may be increased, and the core area required for the magnetic flux may be reduced as compared to conventional multiphase power converter transformers.

Additionally, the magnetic flux interaction between the coils 104, 106 may assist in reducing the volume of the magnetic structure 102, as explained herein. For instance, the magnetic structure's geometry and the flux interaction may allow the coils 104, 106 to share the outer legs 112a, 112d. For example, and as shown in FIG. 3, each outer leg 112a, 112d may provide return paths for magnetic flux generated by both coils 104, 106. Thus, the outer legs 112a, 112d may be shared between the coils 104, 106. In such examples, the magnetic structure 102 may have at least two less legs (e.g., two less outer legs) as compared to multiphase power converters including conventional independent (e.g., separate) transformers. Thus, the size of the magnetic structure 102 may be reduced as compared to conventional magnetic structure(s) employed in multiphase power converters, as further explained herein. Because of the reduced size of the magnetic structure 102, the power density of a multiphase power converter employing the transformer 100 may be increased and core losses in the multiphase power converter may be decreased as compared to conventional converters. This reduction of core losses may lead to higher efficiency.

In the particular example of FIG. 1, the magnetic structure 102 is formed of a single piece of material. In such examples, the magnetic structure 102 may have a monolithic construction. In other examples, the magnetic structure 102 may be formed from two or more separate pieces of material, and then coupled together. In such examples, any one or more portions of the magnetic structure 102 may have a particular shape. For example, the legs 112a, 112b, 112c, 112d and one of the members 108, 110 may be formed of three substantially U-shaped core sections, and the other one of the members 108, 110 may be formed of one or more substantially I-shaped core sections. In other examples, each of the legs 112a, 112b, 112c, 112d and members 108, 110 may be separately formed (e.g., I-shaped core sections), and then coupled together.

Figure 4:
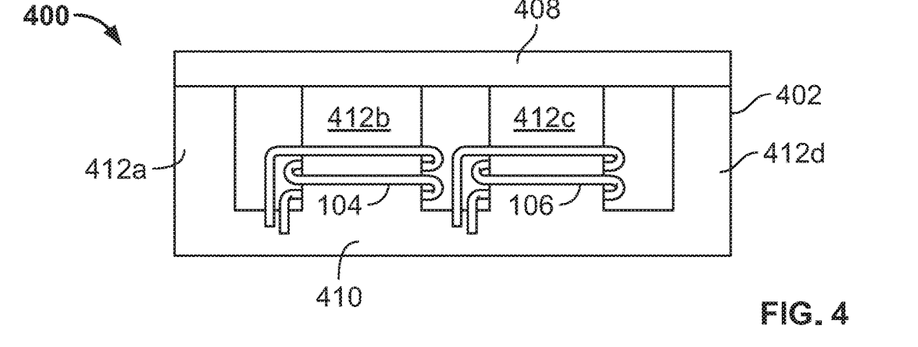
FIG. 4 is a front view of a transformer for a multiphase power converter, where the transformer includes a magnetic structure having four legs according to another example embodiment.
Figure 5:
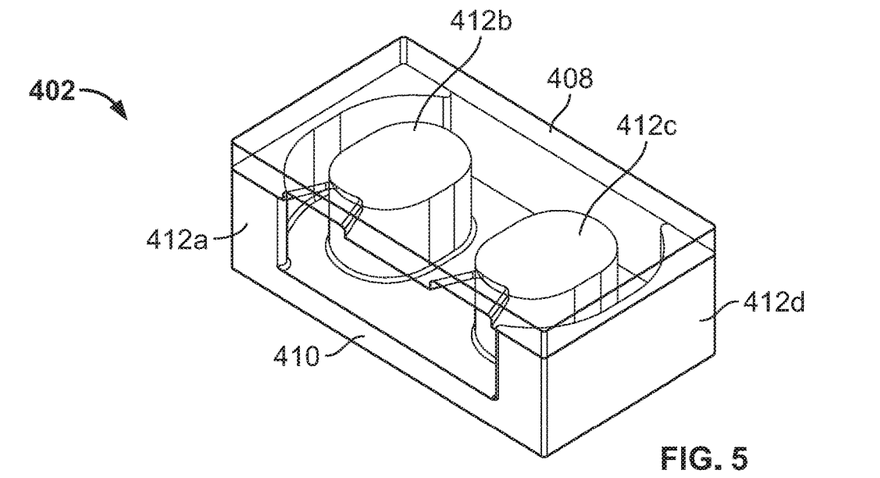
FIG. 5 is an isometric view of the magnetic structure of FIG. 4.

In another example, the legs 112a, 112b, 112c, 112d, and one of the members 108, 110 may be formed of a single piece of material, and the other one of the members 108, 110 may be formed of a single piece of material. For example, FIGS. 4 and 5 illustrate a magnetic structure (e.g., a magnetic core) 402 substantially similar to the magnetic structure 102 of FIG. 1, but where core sections are formed out of two pieces of material. In such examples, the magnetic structure 402 may include an increased effective core area per volume and/or an a decreased volume per effective core area as compared to conventional magnetic structures, as explained herein.

As shown in FIGS. 4 and 5, the magnet structure 402 includes members 408, 410, and legs 412a, 412b, 412c, 412d extending between the members 408, 410 in substantially the same direction. The core sections of the magnet structure 402 may form paths for magnetic flux in a similar manner as explained above relative to FIG. 3.

As shown, the legs 412a, 412b, 412c, 412d and the member 410 are formed of a single piece of material, and the member 408 is formed of a single piece of material. Alternatively, the legs 412a, 412b, 412c, 412d and the member 408 may be formed of a single piece of material, and the member 410 may be formed of a single piece of material. In other examples, the magnetic structure 402 may be formed of a single piece of material similar to the magnetic structure 102 of FIG. 1, and/or three or more pieces of material if desired. For example, each of the legs 412a, 412b, 412c, 412d and members 408, 410 may be separately formed, and then coupled together.

In the particular example of FIGS. 4 and 5, the members 408, 410 are I-shaped core sections. For example, the members 408, 410 have a substantially rectangular shape. In other examples, one or both members 408, 410 may have another suitable shape such as oval, square, etc. if desired.

The legs 412a, 412b, 412c, 412d may have the same shape or different shapes. In the particular example of FIGS. 4 and 5, the legs 412a, 412b have similar shapes, and the legs 412b, 412c have similar shapes. The shape of the legs 412b, 412c is different than the shape of the legs 412a, 412b. For example, the perimeter of each outer leg 412a, 412d generally follows a rectangular shape along three sides (e.g., the exterior facing sides), and a crescent shape along its interior facing side. In such examples, the outer legs 412a, 412d may be referred to as crescent-shaped core sections. As shown in FIG. 5, the perimeter of each inner leg 412b, 412c forms a generally round, oval, etc. like shape. In some examples, the curvature of the inner legs 412b, 412c adjacent the outer legs 412a, 412d substantially corresponds to the curvature of the outer legs 412a, 412d (e.g., along their interior facing sides). In other examples, the curvature of the inner legs 412b, 412c and the curvature of the outer legs 412a, 412d may be different, the outer legs 412a, 412d may have the same shape as the inner legs 412b, 412c, etc.

As shown in FIG. 4, coils may be wound about core sections of the magnetic structure 402. For example, the coils 104, 106 of FIGS. 1 and 3 are wound about the inner legs 412b, 412c of the magnetic structure 402. The magnetic structure 402 and the coils 104, 106 of FIG. 4 form a transformer 400. Additionally and/or alternatively, one or more coils may be wound about one or more of the other legs 412a, 412d and/or the members 408, 410 if desired.

Figure 6:
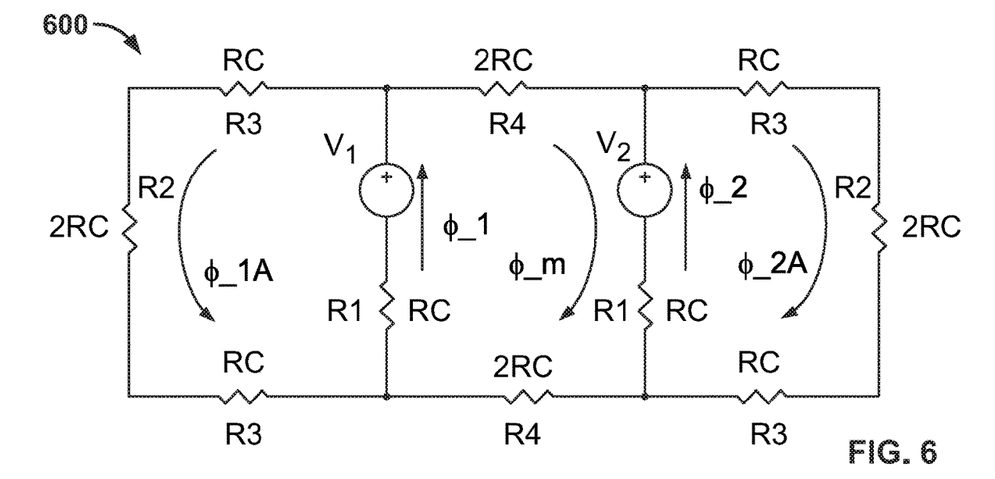
FIG. 6 is an equivalent circuit of the magnetic structure of FIGS. 4 and 5, according to another example embodiment.

FIG. 6 illustrates an equivalent circuit 600 of the magnetic structure 402 of FIGS. 4 and 5 with the coils 104, 106 wound about the inner legs 412b, 412c of the magnetic structure 402. As shown in FIG. 6, the equivalent circuit 600 includes two voltage sources V1, V2 representing magneto-motive forces in the magnetic structure 402, and various resistances R1, R2, R3, R4 representing reluctances in different core sections of the magnetic structure 402.

In the example of FIG. 6, the voltage source V1 represents a magneto-motive force from the coil 104, and is calculated by multiplying the number of turns (N) of the coil 104 by the amount of current (Imag1) flowing through the coil 104. Similarly, the voltage source V2 represents a magneto-motive force from the coil 106, and is calculated by multiplying the number of turns (N) of the coil 106 by the amount of current (Imag2) flowing through the coil 106. Additionally, the resistances R1 represent reluctances in the inner legs 412b, 412c, the resistances R2 represent reluctances in the outer legs 412a, 412d, the resistances R3 represent reluctances in the outer portions of each member 408, 410, and the resistances R4 represent reluctances in the inner portion of each member 408, 410.

The reluctance (R) in each core section may be calculated using equation (1) below. In equation (1), Lc is the length of the core section, Ac is the cross-sectional area of the core section through which the magnetic flux passes, and µ is the permeability of the magnetic material in the core section.

$$R \frac{Lc}{\mu * Ac} \qquad \text{Equation (1)}$$

In the particular example of FIG. 6, the cross-sectional area of the inner portion of each member 408, 410 is half the cross-sectional area of each inner leg 412b, 412c. Additionally, the length of the inner portion of each member 408, 410 is the same as the length of the inner leg 412b, 412c. The cross-sectional area and the length of the outer legs 412a, 412d are the same as the cross-sectional area and the length of the inner portion of each member 408, 410. Thus, if the reluctance of each inner leg 412b, 412c is equal to the value RC (as shown in FIG. 6), the reluctances of the inner portion of each member 408, 410 and the reluctances of the outer legs 412a, 412d are equal to the value 2*RC when using equation (1) above, as shown in FIG. 6.

Likewise, the cross-sectional area of the outer portions of each member 408, 410 is half the cross-sectional area of each inner leg 412b, 412c. The length of the outer portions of each member 408, 410 is half the length of the inner leg 412b, 412c. As such, if the reluctance of each inner leg 412b, 412c is equal to the value RC (as above), the reluctance of the inner portion of each member 408, 410 is equal to the value RC (as shown in FIG. 6) when using equation (1).

The magnetic flux (Φ) in the core sections may be calculated using equation (2) below. In equation (2), N is the number of turns of the coil, Imag is the magnitude of the current flowing through the coil, and R is the total equivalent reluctance based on the path of the magnetic flux.

$$\Phi = \frac{N * Imag}{R} \qquad \text{Equation (2)}$$

As shown in FIG. 6, Φ_1A represents the magnetic flux generated by the coils 104, 106 in the outer leg 412a and the outer portions of each member 408, 410 adjacent to the outer leg 412a, and Φ_2A represents the magnetic flux generated by the coils 104, 106 in the outer leg 412d and the outer portions of each member 408, 410 adjacent to the outer leg 412d. Additionally, Φ_m represents the magnetic flux generated by the coils 104, 106 in the inner portions of each member 408, 410. Φ_1, Φ_2 represent the magnetic flux generated by the coils 104, 106 in the inner legs 412b, 412c, respectively.

The magnetic fluxes Φ_1A, Φ_2A, Φ_m, Φ_1, Φ_2 may be calculated with equations (3)-(7) below. In the particular example of FIG. 4, the number of turns (N) of the coils 104, 106 is the same. In other examples, the number of turns of the coils 104, 106 may be different if desired. In equations (3)-(7), the current flowing through the coil 104 is represented by Imag1, the current flowing through the coil 106 is represented by Imag2, and the RC value (e.g., 35*RC and 7*RC) represents the total equivalent reluctance based on the path of the magnetic flux.

$$\Phi\_1A = \frac{(6*N*Imag1) + (N*Imag2)}{35*RC} \quad \text{Equation (3)}$$

$$\Phi\_2A = \frac{(N*Imag1) + (6*N*Imag2)}{35*RC} \quad \text{Equation (4)}$$

$$\Phi\_m = \frac{N*(Imag1 - Imag2)}{7*RC} \quad \text{Equation (5)}$$

$$\Phi\_1 = \frac{(11*N*Imag1) - (4*N*Imag2)}{35*RC} \quad \text{Equation (6)}$$

$$\Phi\_2 = \frac{(11*N*Imag2) - (4*N*Imag1)}{35*RC} \quad \text{Equation (7)}$$

In some examples, the magnetic flux in the magnetic structure 402 and the current flowing through the coils 104, 106 may be the only time dependent variables in equations (2)-(7). This may be the case when the transformer 400 (and/or any of the other transformers disclosed herein) is employed in a multiphase power converter including, for example, two or more interleaved forward subconverters. In such examples, the time dependent variables may be expressed as equation (8) below.

$$\frac{\partial \Phi}{\partial t} = \frac{\partial \Phi}{\partial Imag} * \frac{\partial Imag}{\partial t} \quad \text{Equation (8)}$$

As further explained below, when one of the subconverters of the multiphase power converter is in its idle period, little to no current flows through the subconverter. For example, each forward subconverter includes a repeating cycle of a conduction period, a reset period, and an idle period. The conduction period is a period where power is transferred via the transformer, the reset period is a period where the transformer releases its energy stored during the conduction period for demagnetizing (e.g., resetting) the transformer, and the idle period is a period where the transformer is demagnetized and power is not transferred via the transformer. Typically, when one of the subconverters is in its conduction period, the other subconverter(s) are in their reset period or idle period.

Equations (3)-(7) above may be used to determine whether current is flowing through one of the subconverters during its idle period. For example, when a subconverter A of the multiphase power converter (e.g., the subconverter including an input and/or output circuit electrically coupled to the coil 106) is in its idle period, the current Imag2 flowing through the coil 106 is zero. During this period, another subconverter B of the multiphase power converter (e.g., the subconverter including an input and/or output circuit electrically coupled to the coil 104) may be in its conduction period. In such examples, equations (9) and (10) below may be derived based on equations (3)-(7).

$$\frac{\partial}{\partial Imag1}\Phi\_1 = \frac{11*N}{35*RC} \quad \text{Equation (9)}$$

$$\frac{\partial}{\partial Imag1}\Phi\_2 = \frac{-4*N}{35*RC} \quad \text{Equation (10)}$$

In such examples, the change in the magnetic flux Φ_1 over time may be limited by the power converter's bulk input voltage Vbulk divided by the number of turns N of the coil 104. In such examples, equations (9) and (10) show that the magnetic flux Φ_2 may be limited to −4/11 (i.e., −0.36) of the change in the magnetic flux Φ_1 when the subconverter A is in its idle period. As such, the magnetic flux Φ_2 will produce a low voltage (e.g., −0.36*Vbulk) on the coil 106 (e.g., a primary winding of the subconverter A). As a result, little to no current flows through the subconverter A (e.g., primary side power switches, body diodes of the power switches, reset components such diodes, etc.). The subconverter B experiences similar results when in its idle period, and the change in the magnetic flux Φ_2 over time is limited by the bulk input voltage Vbulk divided by the number of turns N of the coil 106.

Figure 7:
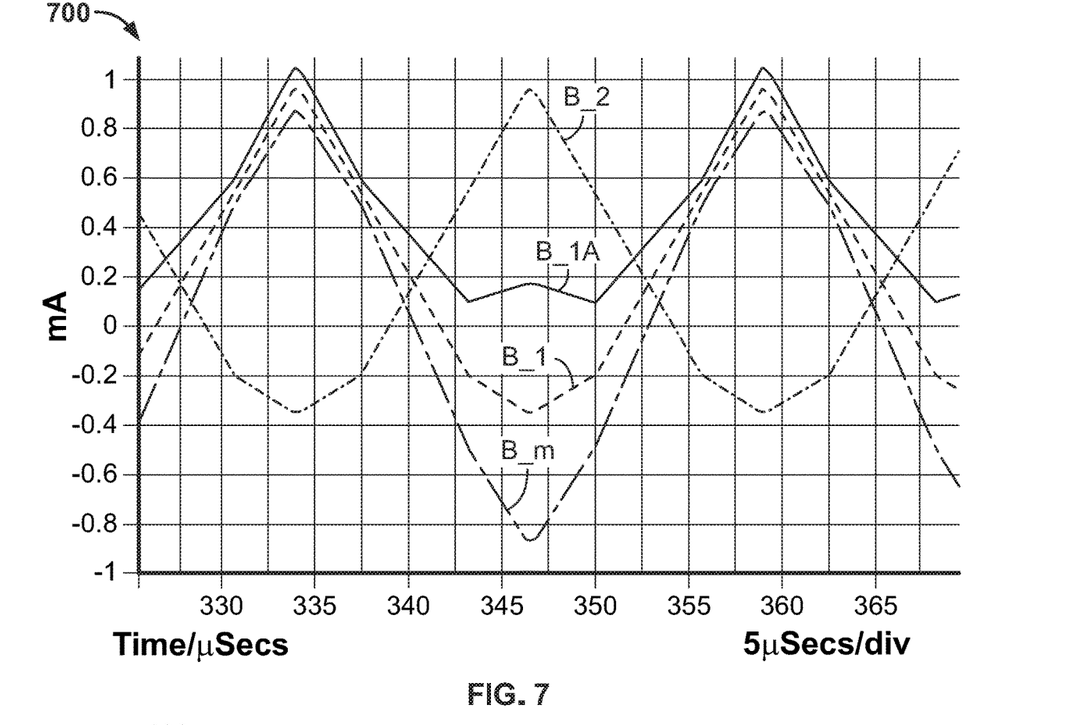
FIG. 7 is a graph showing flux densities in the magnetic structure of FIGS. 4 and 5, according to yet another example embodiment.

When the change in the magnetic flux Φ_1, Φ_2 over time (dΦ_1/dt, dΦ_2/dt) is limited as explained above, flux densities in the magnetic structure 402 may be normalized to the center legs 412b, 412c rather than in the outer legs 412a, 412d. For example, FIG. 7 illustrates a graph 700 showing the flux densities B_1, B_2, B_1A, B_m corresponding to the magnetic fluxes Φ_1, Φ_2, Φ_1A, Φ_m, respectively, in the magnetic structure 402. As shown, the peak-to-peak values of the flux densities B_1, B_2 (corresponding to the magnetic fluxes in the center legs 412b, 412c) are nominal, the peak-to-peak value of the flux density B_m (corresponding to the magnetic flux in the inner portions of each member 408, 410) is larger than the peak-to-peak values of the flux densities B_1, B_2, and the peak-to-peak value of the flux density B_1A is less than the peak-to-peak values of the flux densities B_1, B_2. Although not shown, the peak-to-peak value of a flux density corresponding to the magnetic flux Φ_2A in the outer leg 412d is similar to the peak-to-peak value of the flux density B_1A. As such, the outer legs 412a, 412d may have a reduced peak-to-peak flux density, and the flux density B_m (corresponding to the magnetic in the inner portions of each member 408, 410) may have an increased peak-to-peak flux density as compared to conventional magnetic structures.

Figure 8:
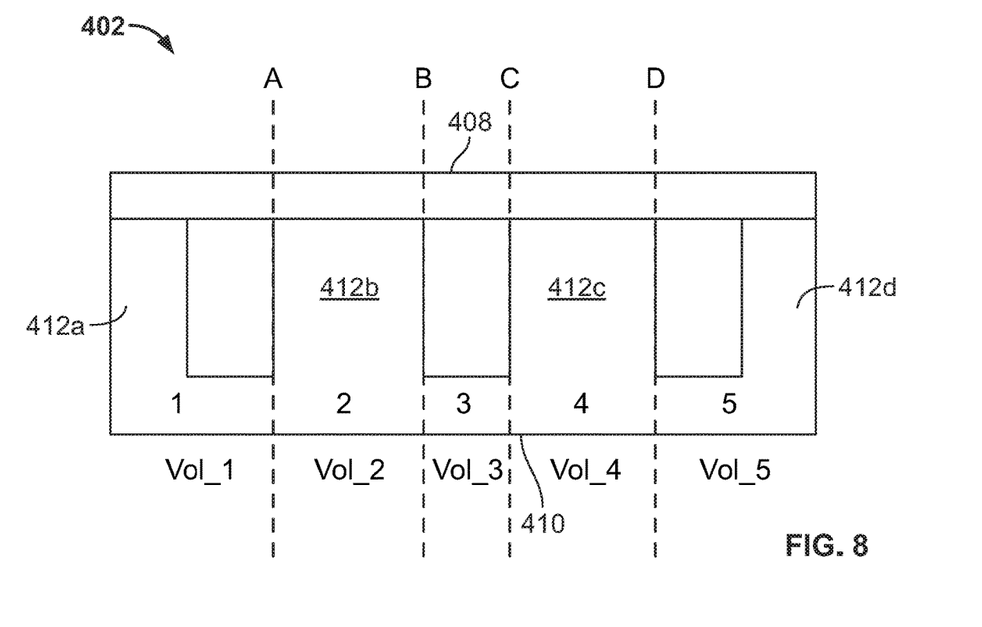
FIG. 8 is a front view of the magnetic structure of FIGS. 4 and 5 divided into five sections.

FIG. 8 illustrates the magnetic structure 402 of FIGS. 4 and 5 divided into different sections 1, 2, 3, 4, 5. Specifically, section 1 is to the left of line A, section 2 is between lines A, B, section 3 is between lines B, C, section 4 is between lines C, D, and section 5 is the magnetic structure 402 is to the right of line D. As such, section 1 includes the outer leg 412a and portions of the members 408, 410, section 2 includes the inner leg 412b and portions of the members 408, 410, section 3 includes inner portions of the members 408, 410, section 4 includes the inner leg 412c and portions of the members 408, 410, and section 5 includes the outer leg 412d and portions of the members 408, 410. As shown in FIG. 8, the volume (Vol_1) of section 1, the volume (Vol_2) of section 2, the volume (Vol_4) of section 4, and the volume (Vol_5) of section 5 are approximately equal.

In some examples, the flux swing within the magnetic structure 402 (and/or any other magnetic structure disclosed herein) may be reduced as compared to conventional magnetic structures. For example, the volume for each of the five sections may be normalized to the total volume. As such, each section 1, 2, 3, 4, 5 may have a normalized volume of ⅕ of the total core volume. In such examples, the reduced peak-to-peak flux density (e.g., in sections 1 and 5 including the outer legs 412a, 412d) is seen in ⅖ of the total core volume, the increased peak-to-peak flux density (e.g., in section 3 including inner portions of the members 408, 410) is seen in ⅕ of the total core volume, and the nominal peak-to-peak flux density (e.g., in sections 2, 4 including inner legs 412b, 412c) is seen in ⅖ of the total core volume. As a result, the magnetic structure 402 experiences an overall net decrease in flux swing within the core volume.

Additionally, the core loss of the magnetic structure 402 may be reduced as compared to conventional magnetic structures. For example, core loss is a function of the peak-to-peak flux density and the switching frequency of power switches in the subconverters. As such, when the magnetic structure 402 experiences an overall net decrease in flux swing within the core volume, the core loss of the magnetic structure 402 is reduced as compared to conventional magnetic structures. For example, and as shown in Table 1 below, the normalized core loss due to the decrease in flux swing in section 1 is ¹⁄₂₅ (i.e., the normalized volume (⅕) in section 1 multiplied by the normalized core loss density (⅕) in section 1). The other normalized core losses (due to the flux swing) in sections 2-5 are shown in table 1. The total normalized core loss due to the decrease in flux swing in the magnetic structure 402 is obtained by adding the core losses for each section. As shown in Table 1, the total normalized core loss (due to the flux swing) in the entire magnetic structure 402 is 0.88 (²²⁄₂₅).

TABLE 1

| | Volume (Normalized to total volume) | Flux (Normalized) | Core Loss Density (Normalized) | Core Loss (Normalized) |
|---|---|---|---|---|
| Section 1 | ⅕ | 0.5 | ⅕ | ¹⁄₂₅ |
| Section 2 | ⅕ | 1 | 1 | ⅕ |
| Section 3 | ⅕ | 1.3 | 2 | ⅖ |
| Section 4 | ⅕ | 1 | 1 | ⅕ |
| Section 5 | ⅕ | 0.5 | ⅕ | ¹⁄₂₅ |
| Core Loss (Flux) | | | | 22/25 = 0.88 |
| Frequency | ⅔ | | 0.5 | =0.5 * 0.88 |
| Total Core Loss | | | | 0.44 |

Further, if the switching frequency of the subconverters is reduced, the core loss may be further reduced as compared to conventional converters. For example, the switching frequency may be reduced by 33% (e.g., a 67% reduced frequency) to allow for slower switching of power switches in the subconverters. In such examples, the normalized core loss density due to the reduced frequency may be 0.5, as shown in Table 1 above. As a result, the total normalized core loss due to the reduced frequency and flux swing in the magnetic structure 402 may be obtained by multiplying the normalized core loss density due to the reduced frequency (0.5) by the normalized core loss due to the reduced flux swing (0.88). As shown in Table 1, the total normalized core loss is 0.44. Thus, the magnetic structure 402 may include a larger effective core area (e.g., a 33% increase, etc.) as compared to a conventional magnetic structure having separate transformers, while maintaining the same volume as the conventional structure, and experiencing 44% of the core loss experienced with the conventional magnetic structure.

In other examples, the total volume of the magnetic structure 402 may be reduced (e.g., a 33% reduction, etc.) as compared the conventional structure having separate transformers. In such examples, the effective core area of the magnetic structure 402 may be the same as the effective core area of the conventional structure. Additionally, the number of turns of the coils 104, 106, the volt-seconds (e.g., the magnetic flux), and/or the frequency may be the same as the number of turns, the volt-seconds, and/or the frequency of the conventional structure. In such cases, the overall core loss density (e.g., taking into account the flux swing and frequency) may be 0.88. However, because the core volume is reduced as compared to the conventional structure, the total core loss may be reduced as compared to the core loss in the conventional structure. For example, if the core volume is reduced by 33% (e.g., a reduction of 67%) as compared to the volume of the conventional structure, the total core loss is reduced to 0.59 (e.g., 0.88*0.67). As such, in this example, the magnetic structure 402 may experience 59% of the core loss for the conventional structure.

Figure 9:
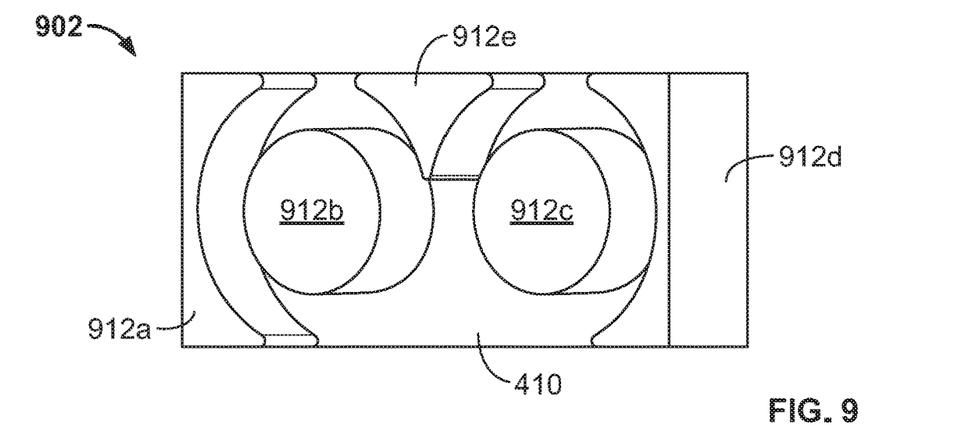
FIG. 9 is a perspective view of a magnetic structure including five legs according to another example embodiment.

In some examples, any one of the magnetic structures disclosed may include one or more additional legs. Coils may or may not be wound about the additional legs. For example, FIG. 9 illustrates a magnetic structure 902 that is substantially similar to the magnetic structures 102, 402 of FIGS. 1-5, but including an additional inner leg. Specifically, and as shown in FIG. 9, the magnetic structure 902 includes the member 410 of FIGS. 4 and 5, and legs 912a, 912b, 912c, 912d, 912e. In the particular example of FIG. 9, no coil is wound about the leg 912e. The legs 912a, 912b, 912c, 912d are similar to the legs 412a, 412b, 412c, 412d of FIGS. 4 and 5. However, the inner legs 912b, 912c have a circular cross-sectional shape.

The legs 912a, 912b, 912c, 912d, 912e extend between the member 410 and another member (not shown) such as the member 108 of FIGS. 1-3, the member 408 of FIGS. 4-5, etc. As such, the legs 912a, 912b, 912c, 912d, 912e separate the members.

Additionally, and as shown in FIG. 9, the leg 912e is positioned between the legs 912b, 912c. In such examples, a transformer including the magnetic structure 902 may experience less inductive (e.g., magnetic) coupling between when one subconverter of a multiphase power converter utilizes the transformer and another one subconverter of the multiphase power converter utilizes the transformer.

In the particular example of FIG. 9, the leg 912e has a triangular-shaped cross section. For example, the perimeter of the leg 912e includes a flat (e.g., straight) exterior facing side, and two curved (e.g., crescent-shaped) interior facing sides. The curvature of the interior facing sides may substantially correspond to the curvature of the inner legs 912b, 912c. As shown, the exterior facing side of the leg 912e is adjacent to an edge of the member 410, and the interior facing sides of the leg 912e meet (e.g., form an edge) between the inner legs 912b, 912c. As such, the leg 912e extends between the inner legs 912b, 912c and the coils (not shown) wound about the inner legs 912b, 912c.

In some examples, the effective core area of the magnetic structure 902 may be substantially similar (and in some cases the same) as the effective core area of the magnetic structure 402. For example, the amount of material forming the outer legs 912a, 912d may be reduced as compared to the outer legs 412a, 412d. This material may be used to form the leg 912e. As such, the reduction of material in each outer leg 912a, 912d may be substantially equal to the amount of material in the inner leg 912e. In such examples, the cross-sectional area of the combination of the outer legs 912a, 912d and the inner leg 912e may be about half the cross-sectional area of the inner legs 912b, 912c.

Figure 10:
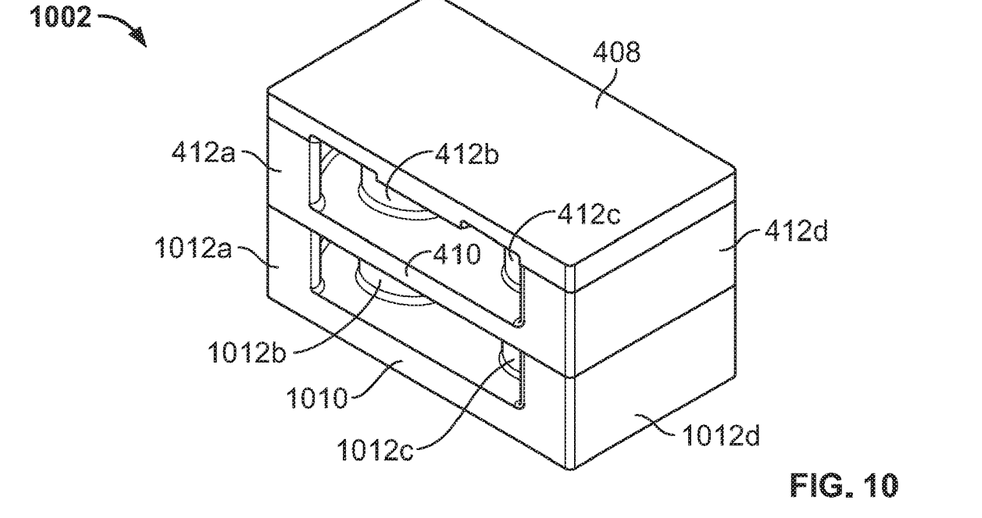
FIG. 10 is an isometric view of a magnetic structure including eight legs arranged in a stacked configuration according to yet another example embodiment.

In other examples, the magnetic structures disclosed herein may include additional legs with coils wound thereon. For example, FIG. 10 illustrates a magnetic structure 1002 having a stacked configuration. The magnetic structure 1002 is substantially similar to the magnetic structure 402 of FIGS. 4 and 5, but includes four additional legs.

Specifically, the magnetic structure 1002 includes legs 1012a, 1012b, 1012c, 1012d, a member 1010, and the legs 412a, 412b, 412c, 412d and the members 408, 410 of FIGS. 4 and 5. As shown, the legs 412a, 412b, 412c, 412d extend between the members 408, 410, and the legs 1012a, 1012b, 1012c, 1012d extend between the members 410, 1010. The members 408, 410, 1010 extend in parallel planes, and the legs 412a, 412b, 412c, 412d, 1012a, 1012b, 1012c, 1012d extend in planes substantially perpendicular to the members 408, 410, 1010.

The legs 1012a, 1012b, 1012c, 1012d are substantially aligned with the legs 412a, 412b, 412c, 412d. Specifically, the legs 1012a, 1012b, 1012c, 1012d are substantially aligned with the legs 412a, 412b, 412c, 412d, respectively, in a stacked configuration (e.g., in a longitudinal direction), as shown in FIG. 10. In other examples, one or more of the legs 1012a, 1012b, 1012c, 1012d may be offset relative to the legs 412a, 412b, 412c, 412d.

As shown in FIG. 10, the legs 1012a, 1012b, 1012c, 1012d extend on a side of the member 410 opposing the legs 412a, 412b, 412c, 412d. For example, the legs 1012a, 1012b, 1012c, 1012d extend from one side of the member 410, and the legs 412a, 412b, 412c, 412d extend from another (opposing) side of the member 410. In other examples, one or more of the legs 1012a, 1012b, 1012c, 1012d may extend on the side of the member 410 adjacent to the legs 412a, 412b, 412c, 412d.

Figure 11:
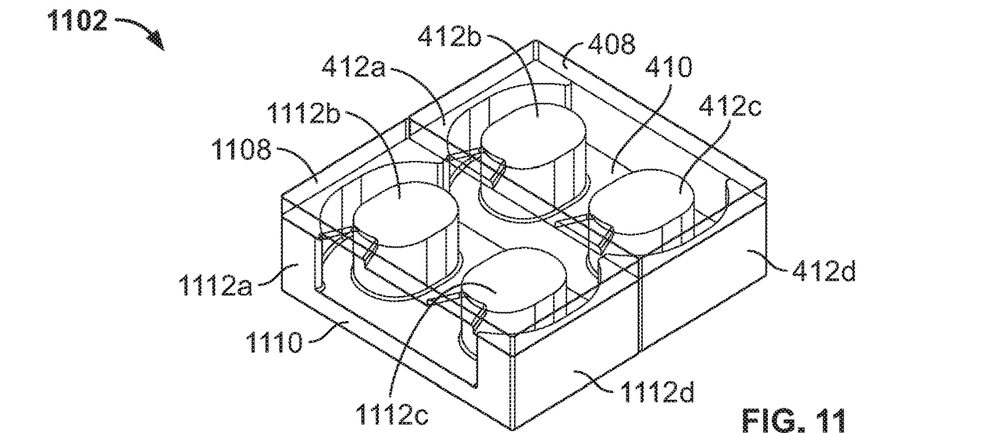
FIG. 11 is an isometric view of a magnetic structure including eight legs arranged in a side-by-side configuration according to another example embodiment.

FIG. 11 illustrates a magnetic structure 1102 similar to the magnetic structure 1002 of FIG. 10, but having a side-by-side configuration. Specifically, the magnetic structure 1102 includes legs 1112a, 1112b, 1112c, 1112d, members 1108, 1110, and the legs 412a, 412b, 412c, 412d and members 408, 410 of FIGS. 4 and 5. As shown, the legs 412a, 412b, 412c, 412d extend between the members 408, 410, and the legs 1112a, 1112b, 1112c, 1112d extend between the members 1108, 1110. The members 408, 410, 1108, 1110 extend in parallel planes, and the legs 412a, 412b, 412c, 412d, 1112a, 1112b, 1112c, 1112d extend in planes substantially perpendicular to the members 408, 410, 1108, 1110.

The legs 1112a, 1112b, 1112c, 1112d are substantially aligned with the legs 412a, 412b, 412c, 412d. Specifically, the legs 1112a, 1112b, 1112c, 1112d are substantially aligned with the legs 412a, 412b, 412c, 412d in a side-by-side configuration. For example, and as shown in FIG. 11, the legs 1112a, 1112b, 1112c, 1112d are positioned adjacent to the legs 412a, 412b, 412c, 412d, respectively, in a lateral direction.

In the examples of FIGS. 10 and 11, one or more coils may be wound about each inner leg 412b, 412c, 1012b, 1012c, 1112b, 1112c. In such examples, each coil may represent a primary transformer winding or a secondary transformer winding of one phase (e.g., corresponding to one subconverter) of a multiphase power converter. As such, each magnetic structures 1002, 1102 of FIGS. 10 and 11 may be part of a transformer employed in a power converter having four subconverters.

Figure 12:
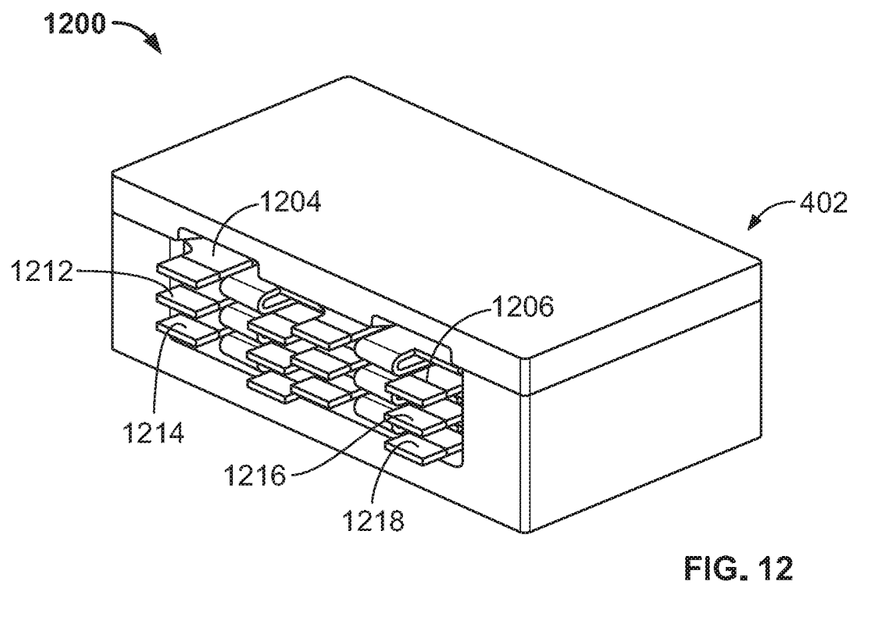
FIG. 12 is an isometric view of the transformer of FIG. 4 including plate windings according to yet another example embodiment.

The coils disclosed herein may be any suitable types of coils. For example, one or more of the coils may include conductive wire coils (e.g., wire windings) as shown in FIGS. 1-4, etc. Alternatively, one or more of the coils may include plate coils (e.g., plate windings). For example, FIG. 12 illustrates a transformer 1200 including the magnetic structure 402 of FIGS. 4 and 5, and plate coils wound about its inner legs (not shown). Specifically, and as shown in FIG. 12, the transformer 1200 includes coils 1204, 1212, 1214 wound about one of the inner legs (e.g., the leg 412b), and coils 1206, 1216, 1218 wound about the other inner leg (e.g., the leg 412c). In such examples, the coils 1204, 1212, 1214 may represent one or more primary windings and/or secondary windings of one power converter phase, and the coils 1206, 1216, 1218 may represent one or more primary windings and/or secondary windings of another power converter phase.

Additionally, the coils may include any suitable number of turns. For example, in the embodiment of FIG. 2, the coils 104, 106, 204, 206 may have the same number of turns. In other examples, the coils 104, 106 may have a larger or smaller number of turns as the coils 204, 206. In such examples, the turn ratio of the coils 104, 204 may be the same as the turn ratio of the coils 204, 206. In some examples, the turn ratio of the coils 104, 204 may be different than the turn ratio of the coils 204, 206.

In some examples, the magnetic structures disclosed herein may include an air gap between core sections. For example, in the embodiment of FIG. 4, the inner legs 412b, 412c and the member 408 may define air gaps. Specifically, an air gap may be between the inner leg 412b and the member 408, and/or an air gap may be between the inner leg 412c and the member 408. In such examples, the air gap(s) may assist in reducing third quadrant operation, reducing the peak flux density in the outer legs 412a, 412b, reducing inductive (e.g., magnetic) coupling, and maintaining the reluctance of the inner legs 412b, 412c. In other examples, no air gap may be between the inner legs 412b, 412c and the member 408. In such examples, the inductive coupling may allow a shorter reset time of the transformer as compared to embodiments with air gap(s).

The transformers disclosed herein may employed in any suitable multiphase power converter. For example, the transformers may be used in AC/DC power converters including interleaved forward converter topologies, as explained below. In some examples, the AC/DC power converters may have a high power rating such as 2800 W, 3200 W, etc.

Figure 13:
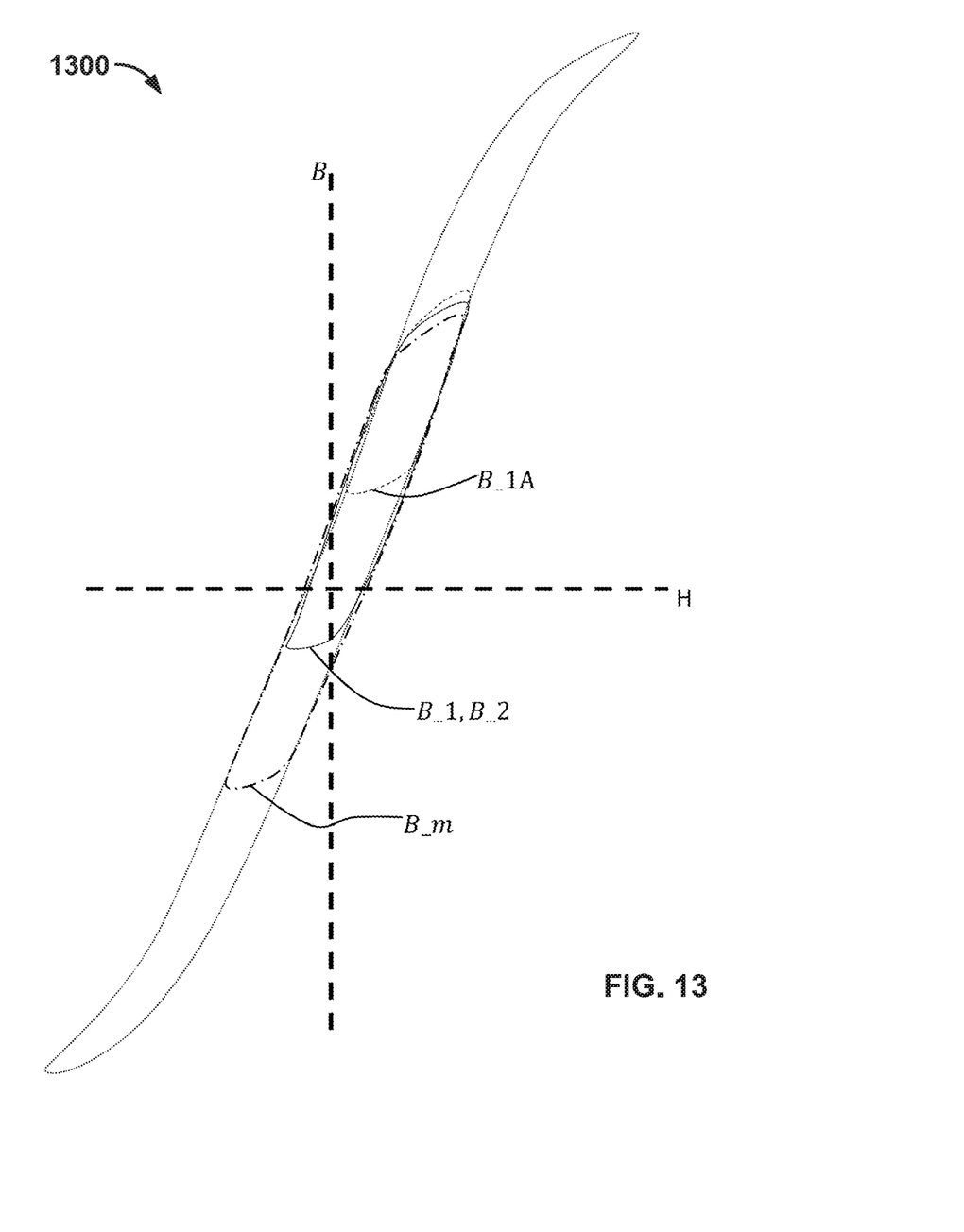
FIG. 13 is a graph showing B-H curves of the flux densities of FIG. 7, according to another example embodiment.

The transformers may be particularly useful in a multiphase power converter (e.g., a multiphase forward power converter, etc.) utilizing the first quadrant of a B-H curve. For example, FIG. 13 illustrates a graph 1300 showing possible relative B-H curves (e.g., loops) of the flux densities $B\_1$, $B\_2$, $B\_1A$, $B\_m$ of FIG. 7. As shown, the curves of the flux densities $B\_1$, $B\_2$ (corresponding to the magnetic fluxes $\Phi\_1$, $\Phi\_2$ in the center legs 412b, 412c of the magnetic structure 402) are the same. Additionally, the curve of the flux density $B\_1A$ (corresponding to the magnetic flux $\Phi\_1A$ in the outer leg 412a of the magnetic structure 402) remains within the first quadrant, and the curves of the flux densities $B\_1$, $B\_2$ are substantially within the first quadrant. Additionally, the curves of the flux densities $B\_1$, $B\_2$, $B\_m$ start in the third quadrant. This may result in lower reset times for the magnetic structure 402 as compared to conventional magnetic structures.

Figure 14:
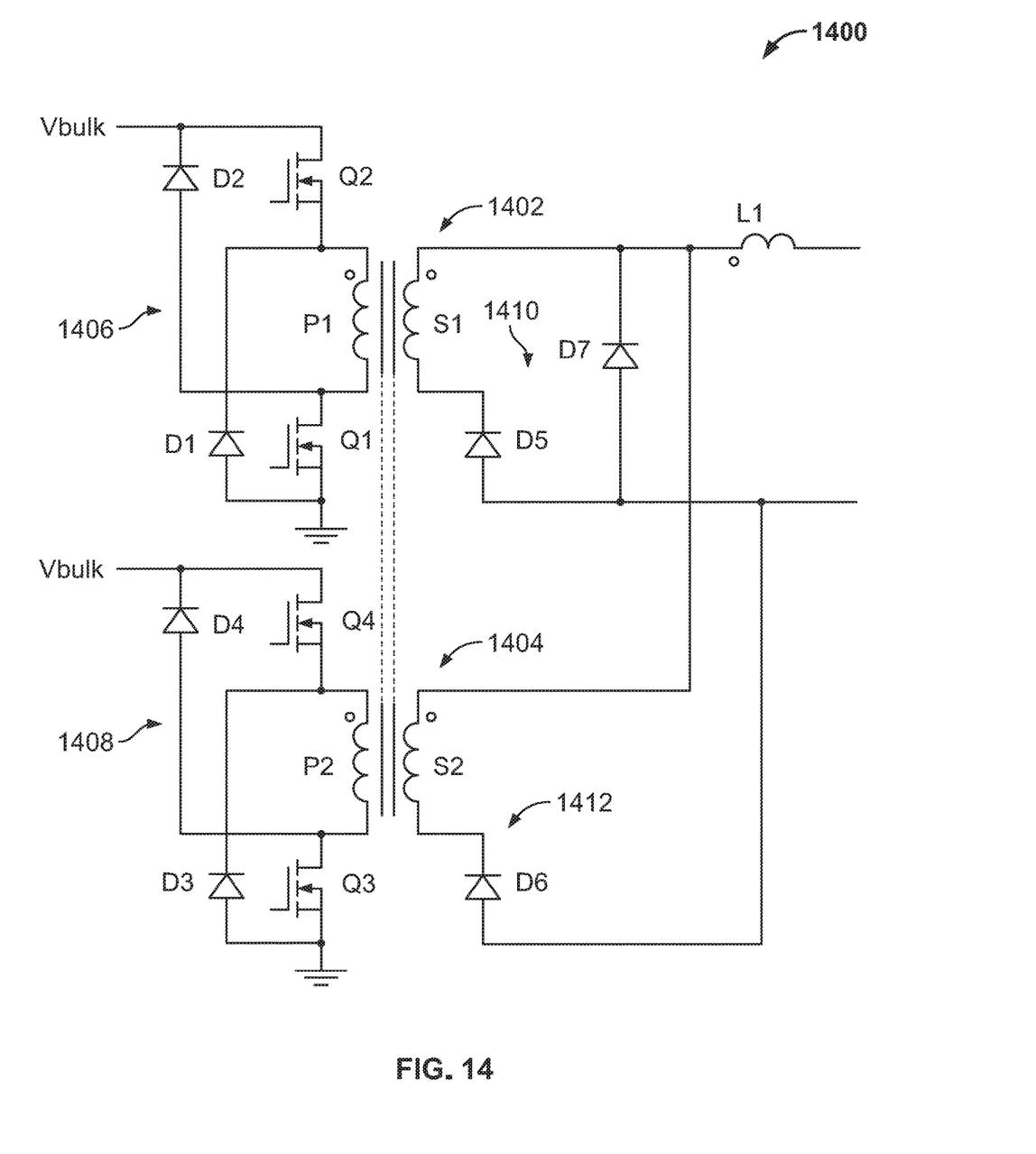
FIG. 14 is an interleaved two-transistor forward power converter according to yet another example embodiment.

FIG. 14 illustrates an isolated two-phase interleaved forward power converter 1400 including two subconverters 1402, 1404, and any one of the transformers disclosed herein for the subconverters 1402, 1404. In the example of FIG. 14, each subconverter 1402, 1404 includes a two-transistor forward converter topology. As such, the power converter 1400 may be considered an interleaved two-transistor forward (ITTF) power converter.

As shown in FIG. 14, each subconverter 1402, 1404 includes an input circuit 1406, 1408 and an output circuit 1410, 1412. Specifically, the input circuit 1406 of the subconverter 1402 includes power switches (e.g., MOSFETs) Q1, Q2, the input circuit 1408 of the subconverter 1404 includes power switches (e.g., MOSFETs) Q3, Q4, the output circuit 1410 of the subconverter 1402 includes a rectification circuit having a diode D5, and the output circuit 1412 of the subconverter 1404 includes a rectification circuit having a diode D6. In other examples, the rectification circuits may include other suitable switching devices such as MOSFETs, etc.

In the example of FIG. 14, each coil of the transformer represents a primary or secondary winding, as explained above. For example, if the transformer 200 of FIG. 2 is employed, the coil 104 may represent a primary winding P1 electrically coupled to the input circuit 1406 of the subconverter 1402, the coil 204 may represent a secondary winding S1 electrically coupled to the output circuit 1410 of the subconverter 1402, the coil 106 may represent a primary winding P2 electrically coupled to the input circuit 1408 of the subconverter 1404, the coil 206 may represent a secondary winding S2 electrically coupled to the output circuit 1412 of the subconverter 1404.

In other examples, the transformers disclosed herein may be employed in other suitable multiphase power converters. For example, any one of the transformers may be used in a multiphase power converter having a bridge converter topology (e.g., a half-bridge converter topology, a full-bridge converter topology, etc.). In such examples, the transformer may assist in zero voltage switching (ZVS) of power switches in the multiphase power converter by allowing magnetic flux to inductively couple between subconverters and portions of the transformer's magnetic core (as explained herein). In contrast, conventional multiphase power converters typical achieve ZVS by using on large circulating currents (e.g., a resonant current in a phase-shifted bridge, a captured magnetizing current resonating with a parasitic capacitance, etc.).

Figure 15:
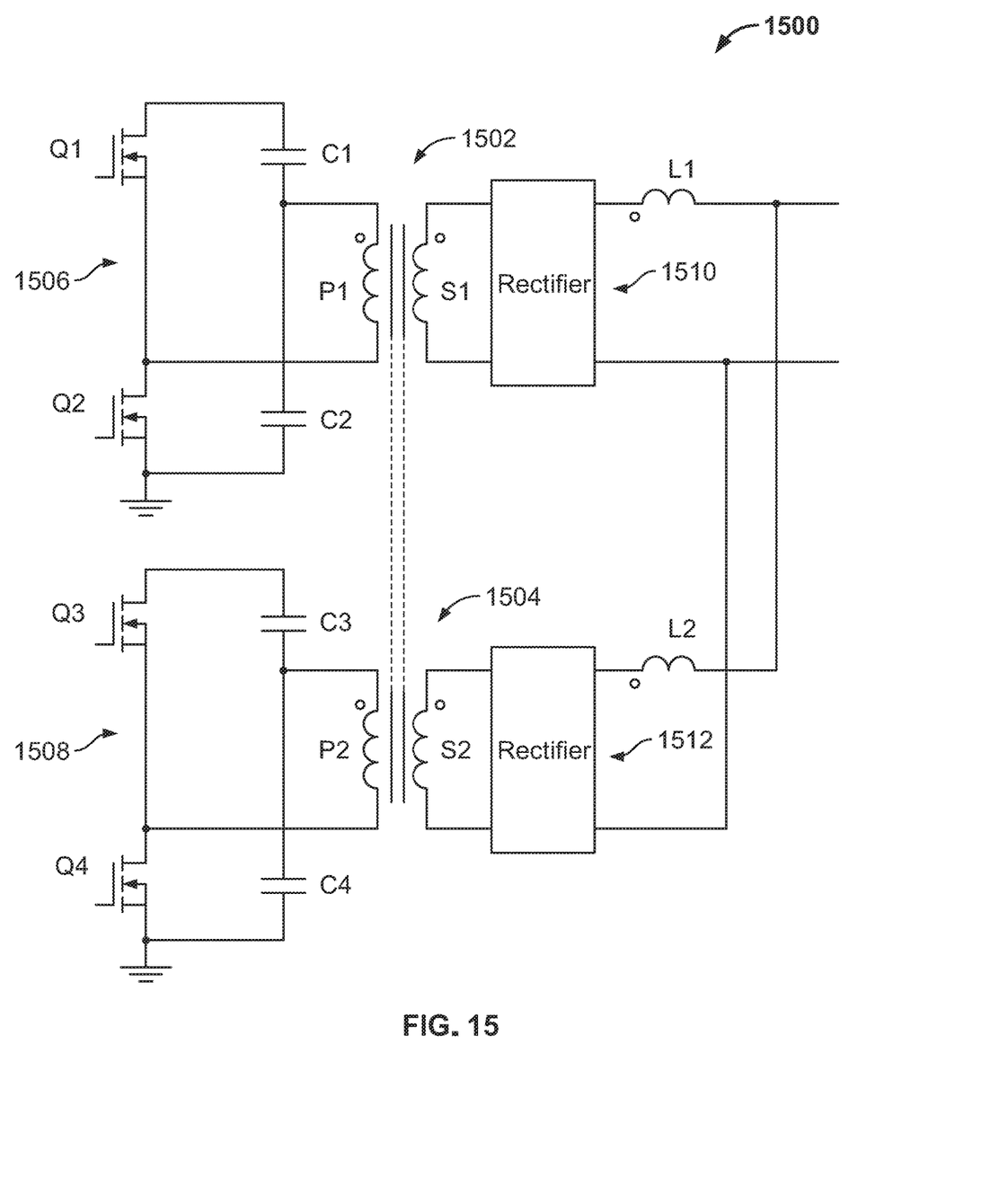
FIG. 15 is an interleaved half bridge power converter according to another example embodiment.

FIG. 15 illustrates a two-phase interleaved bridge converter 1500 including two subconverters 1502, 1504, and any one of the transformers disclosed herein for the subconverters 1502, 1504. In the example of FIG. 15, each subconverter 1502, 1504 includes a half-bridge converter topology. As shown in FIG. 15, the subconverter 1502 includes an input circuit 1506 having two power switches Q1, Q2 and two capacitors C1, C2, and an output circuit 1510 having a rectification circuit (e.g., a diode rectification circuit as shown in FIG. 14, etc.). Likewise, the subconverter 1504 includes an input circuit 1508 having two power switches Q3, Q4 and two capacitors C3, C4, and an output circuit 1512 having a rectification circuit.

In the example of FIG. 15, each coil of the transformer represents a primary or secondary winding, as explained above. For example, if the transformer 200 of FIG. 2 is employed, the coils 104, 106 may represent primary windings P1, P2 electrically coupled to the input circuits 1506, 1508, respectively. Additionally, the coils 204, 206 may represent secondary windings S1, S2 electrically coupled to the output circuits 1510, 1512, respectively.

The multiphase power converter transformers disclosed herein may have multiple advantages over conventional multiphase power converter transformers. For example, the transformers disclosed herein may have a larger effective core area (while maintaining the same volume), a smaller volume (while maintaining the effective core area), etc. as compared to conventional transformers. In some examples, the effective core area may be over 30% larger and/or the volume may be over 30% smaller than the effective core area and/or volume of conventional transformers. For example, in some embodiments, the effective core area of the transformer's magnetic structure (e.g., the magnetic structure of FIGS. 4 and 5) may be 260 mm$^2$, and the effective core area of a conventional magnetic structure having an EIE configuration may be 195 mm$^2$. This results in reduced switching frequencies (e.g., slower switching) for power switches in the multiphase power converter, reduced coil turns, reduced core losses, reduced switching losses, increased holdup times (e.g., due to leakage inductance effects, etc.), higher power density, and higher efficiency (e.g., above 95%, etc) as compared to multiphase power converter with conventional transformers.

Additionally, the transformers may include less core sections (e.g., outer legs, etc.) than conventional separated transformers. As a result, some inductive (e.g., magnetic) coupling may occur in the subject transformers. This coupling may remove resonance in the multiphase power converter after the reset period, and in turn reduce core loss. In some cases, the inductive coupling may drive the magnetic flux into the third quadrant (e.g., as shown in FIG. 13). This may result in lower reset times as compared to conventional transformers.

Further, the transformers may experience peak-to-peak magnetic flux cancellation in at least some of the core sections. In such examples, the transformers may have reduced core losses in the core sections experiencing magnetic flux cancellation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A multiphase power converter comprising:
a plurality of subconverters, each having an input circuit and an output circuit; and
a transformer for the plurality of subconverters, the transformer including:
a magnetic structure;
a first coil electrically coupled to the input circuit or the output circuit of one of the subconverters; and
a second coil electrically coupled to the input circuit or the output circuit of another one of the subconverters;
wherein the magnetic structure includes:
a top member;
a bottom member; and
a plurality of legs extending between the top member and the bottom member in substantially the same direction;
wherein the plurality of legs include two outer members and two inner members positioned between the two outer members; and
wherein the plurality of legs includes only four legs;
wherein the first coil is wound only about one of the two inner members of the magnetic structure; and
wherein the second coil is wound only about the other one of the two inner members of the magnetic structure.

2. The multiphase power converter of claim 1 wherein no coil is wound about either one of the outer members, the top member, or the bottom member of the magnetic structure.

3. The multiphase power converter of claim 1 wherein the plurality of legs is a first plurality of legs; and wherein the magnetic structure includes a second plurality of legs substantially aligned with the first plurality of legs.

4. The multiphase power converter of claim 3 wherein the second plurality of legs is positioned on a side of the bottom member opposing the first plurality of legs.

5. The multiphase power converter of claim 3 wherein the second plurality of legs is positioned adjacent to the first plurality of legs in a lateral direction.

6. The multiphase power converter of claim 1 wherein:
the first coil is:
  a primary winding electrically coupled to the input circuit of said one of the subconverters; or
  a secondary winding electrically coupled to the output circuit in said one of the subconverters; and
the second coil is:
  a primary winding electrically coupled to the input circuit of said another one of the subconverters; or
  a secondary winding electrically coupled to the output circuit in said another one of the subconverters.

7. The multiphase power converter of claim 1 wherein:
when the first coil is energized, magnetic flux generated from the first coil is at least partially coupled to the second coil; and/or
when the second coil is energized, magnetic flux generated from the second coil is at least partially coupled to the first coil.

8. The multiphase power converter of claim 7 wherein the two outer members are positioned to provide return paths for the magnetic flux generated from the first coil and the magnetic flux generated from the second coil.

9. The multiphase power converter of claim 1 wherein the plurality of subconverters is a plurality of interleaved forward subconverters.

10. The multiphase power converter of claim 1 wherein at least one of the plurality of subconverters comprises a bridge topology.

11. A transformer for a multiphase power converter including a plurality of subconverters each having an input circuit and an output circuit, the transformer comprising:
  a magnetic structure;
  a first coil configured to electrically couple to the input circuit or the output circuit of one of the subconverters; and
  a second coil configured to electrically couple to the input circuit or the output circuit of another one of the subconverters;
wherein the magnetic structure includes:
  a top member;
  a bottom member; and
  a plurality of legs extending between the top member and the bottom member in substantially the same direction; and
wherein:
  the plurality of legs includes only four legs comprising two outer members and two inner members positioned between the two outer members;
  the first coil is wound only about one of the two inner members of the magnetic structure; and
  the second coil is wound only about the other one of the two inner members of the magnetic structure.

12. The transformer of claim 11 wherein no coil is wound about either one of the outer members, the top member, or the bottom member of the magnetic structure.

13. The transformer of claim 11 wherein the plurality of legs is a first plurality of legs; and
wherein the magnetic structure includes a second plurality of legs substantially aligned with the first plurality of legs.

14. The transformer of claim 13 wherein the second plurality of legs is positioned on a side of the bottom member opposing the first plurality of legs.

15. The transformer of claim 13 wherein the second plurality of legs is positioned adjacent to the first plurality of legs in a lateral direction.

* * * * *